United States Patent
Di et al.

(10) Patent No.: US 9,432,432 B2
(45) Date of Patent: Aug. 30, 2016

(54) STREAMING MEDIA SEGMENT PREPARATION METHOD AND APPARATUS

(71) Applicant: Huawei Technologies Co., Ltd., Shenzhen, Guangdong (CN)

(72) Inventors: Peiyun Di, Shenzhen (CN); Xin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 228 days.

(21) Appl. No.: 14/230,758

(22) Filed: Mar. 31, 2014

(65) Prior Publication Data

US 2014/0304422 A1   Oct. 9, 2014

(30) Foreign Application Priority Data

Apr. 3, 2013   (CN) .......................... 2013 1 0115656

(51) Int. Cl.
*G06F 15/16* (2006.01)
*H04L 29/06* (2006.01)

(52) U.S. Cl.
CPC .......... *H04L 65/602* (2013.01); *H04L 65/4084* (2013.01); *H04L 65/4092* (2013.01); *H04L 65/80* (2013.01)

(58) Field of Classification Search
CPC ............... H04L 65/4092; H04L 65/60; H04N 21/234309; H04N 21/44209; H04N 21/4622; G06F 17/30867
USPC ......................................................... 709/231
See application file for complete search history.

(56) References Cited

U.S. PATENT DOCUMENTS

| | | | |
|---|---|---|---|
| 2011/0206039 A1* | 8/2011 | Lee ........................ | H04M 7/006 370/352 |
| 2012/0158985 A1* | 6/2012 | Patten .................... | H04L 67/108 709/231 |
| 2012/0209952 A1 | 8/2012 | Lotfallah et al. | |
| 2013/0042015 A1* | 2/2013 | Begen .................... | H04N 19/46 709/231 |
| 2013/0304934 A1* | 11/2013 | Joch ........................ | H04L 65/607 709/231 |
| 2014/0189064 A1* | 7/2014 | Cilli ................... | H04N 21/23439 709/219 |
| 2014/0237019 A1* | 8/2014 | Baccichet ............... | H04L 65/00 709/203 |

FOREIGN PATENT DOCUMENTS

| | | |
|---|---|---|
| CN | 101540896 A | 9/2009 |
| CN | 101753439 A | 6/2010 |
| CN | 102710586 A | 10/2012 |
| WO | WO 2012/011076 A1 | 1/2012 |
| WO | WO 2013/004260 A1 | 1/2013 |

* cited by examiner

*Primary Examiner* — Phuoc Nguyen

(57) ABSTRACT

Embodiments of the present invention provide a streaming media segment preparation method and apparatus. The method includes: determining at least one quality point, where the at least one quality point is separately used to indicate quality of at least one target segment of streaming media in a first time period; and determining, according to the at least one quality point, the at least one target segment of the streaming media in the first time period. In the embodiments of the present invention, streaming media segments are prepared by taking a quality factor of the streaming media segments into consideration, which may avoid the problem that redundant segments are generated during preparation of the streaming media segments according to bit rates, thereby reducing a storage volume of a server.

12 Claims, 6 Drawing Sheets

STREAMING MEDIA SEGMENT PREPARATION METHOD AND APPARATUS

CROSS-REFERENCE TO RELATED APPLICATIONS

This application claims priority to Chinese Patent Application No. 201310115656.3, filed on Apr. 3, 2013, which is hereby incorporated by reference in its entirety.

TECHNICAL FIELD

Embodiments of the present invention relate to the field of communications, and in particular, to a streaming media segment preparation method and apparatus.

BACKGROUND

A streaming media technology is a technology which uses the Hyper Text Transport Protocol (Hyper Text Transport Protocol, HTTP) to implement media data transmission. With this technology, streaming media can be downloaded while being watched.

To adapt to diversity of terminals and fluctuation of bandwidth of a network accessed by a user, when segments of streaming media are to be prepared, a plurality of bit streams with different bit rates is prepared on a server side. Further, each bit stream may be divided into a plurality of segments (segment) according to time periods, where each segment may be played independently. In this case, when a network condition of a terminal changes, the terminal may switch to continue to play a segment which matches the current network condition of the terminal better.

However, in a same time period, segments of close quality may exist in segments corresponding to different bit rates, and are called redundant segments. Existence of the redundant segments does not improve user experience, but improves a storage volume of a server.

SUMMARY

Embodiments of the present invention provide a streaming media segment preparation method and apparatus, to reduce a storage volume of a server.

In a first aspect, a streaming media segment preparation method is provided and includes: determining at least one quality point, where the at least one quality point is separately used to indicate quality of at least one target segment of streaming media in a first time period; and determining, according to the at least one quality point, the at least one target segment of the streaming media in the first time period.

With reference to the first aspect, in an implementation manner of the first aspect, the determining at least one quality point includes: obtaining quality of a plurality of segments, existing in the streaming media in the first time period, to serve as candidate quality points; and selecting the at least one quality point from the candidate quality points according to quality distribution of the candidate quality points.

With reference to the first aspect and the foregoing implementation manner of the first aspect, in another implementation manner of the first aspect, the selecting the at least one quality point from the candidate quality points according to quality distribution of the candidate quality points includes: determining at least one quality interval according to the quality distribution of the candidate quality points; selecting, from the candidate quality points, a candidate quality point corresponding to the at least one quality interval to serve as the at least one quality point, so that the at least one quality point separately falls into different intervals of the at least one quality interval.

With reference to the first aspect and the foregoing implementation manners of the first aspect, in another implementation manner of the first aspect, the selecting the at least one quality point from the candidate quality points according to quality distribution of the candidate quality points includes: selecting, from the candidate quality points, a quality point corresponding to preconfigured M quality points to serve as the at least one quality point.

With reference to the first aspect and the foregoing implementation manners of the first aspect, in another implementation manner of the first aspect, the selecting, from the candidate quality points, a quality point corresponding to preconfigured M quality points to serve as the at least one quality point includes: selecting, from the candidate quality points, a quality point which has a minimum absolute value of a quality difference between the quality point and an $i^{th}$ quality point in the M quality points, to serve as the at least one quality point; or, selecting, from the candidate quality points, a quality point whose quality is lower than that of an $i^{th}$ quality point in the M quality points and is closest to the quality of the $i^{th}$ quality point, to serve as the at least one quality point; or, selecting, from the candidate quality points, a quality point whose quality is greater than that of an $i^{th}$ quality point in the M quality points and is closest to the quality of the $i^{th}$ quality point, to serve as the at least one quality point, where i is a positive integer ranging from 1 to M.

With reference to the first aspect and the foregoing implementation manners of the first aspect, in another implementation manner of the first aspect, the determining, according to the at least one quality point, the at least one target segment of the streaming media in the first time period includes: determining the existing segment, corresponding to the at least one quality point, as the at least one target segment of the streaming media in the first time period.

With reference to the first aspect and the foregoing implementation manners of the first aspect, in another implementation manner of the first aspect, the determining at least one quality point includes: encoding the streaming media in the first time period according to a first bit rate so as to obtain a first segment; determining quality of the first segment as an initial quality point; and determining the at least one quality point based on the initial quality point.

With reference to the first aspect and the foregoing implementation manners of the first aspect, in another implementation manner of the first aspect, the determining the at least one quality point based on the initial quality point includes: generating, by iteration, the at least one quality point by using the initial quality point as an initial iteration point, using at least one quality threshold as an iterative step, and using an iteration termination condition that a bit rate corresponding to the quality point generated by iteration exceeds a preset bit rate range of the streaming media.

With reference to the first aspect and the foregoing implementation manners of the first aspect, in another implementation manner of the first aspect, the iteration termination condition further includes that the quality point generated by iteration exceeds a preset quality range.

With reference to the first aspect and the foregoing implementation manners of the first aspect, in another implementation manner of the first aspect, the determining, according to the at least one quality point, the at least one target segment of the streaming media in the first time period includes: determining at least one bit rate separately according to the at least one quality point; and encoding, separately according to the at least one bit rate, the streaming media in the first time period, so as to obtain the at least one target segment.

With reference to the first aspect and the foregoing implementation manners of the first aspect, in another implementation manner of the first aspect, the method further includes: determining target segments of the streaming media in all time periods; and generating a media presentation description file MPD, where the MPD includes segment information of the target segments in each representation of the streaming media.

With reference to the first aspect and the foregoing implementation manners of the first aspect, in another implementation manner of the first aspect, the MPD includes segment serial numbers of the target segments in each representation, and the target segments in each representation are discontinuously numbered by time period, so that a receiving end determines a time period, in which no target segment exists, in each representation according to discontinuity of the serial numbers.

With reference to the first aspect and the foregoing implementation manners of the first aspect, in another implementation manner of the first aspect, the MPD includes indication information, where the indication information is used to indicate whether each representation has a time period in which no target segment exists, or the indication information is used to indicate a time period, in which no target segment exists, in each representation.

With reference to the first aspect and the foregoing implementation manners of the first aspect, in another implementation manner of the first aspect, the indication information is used to indicate a serial number of a time period and/or time and/or a time period, in which no target segment exists, in each representation.

With reference to the first aspect and the foregoing implementation manners of the first aspect, in another implementation manner of the first aspect, when each representation does not have segment information of a target segment in a specific time period, the MPD uses segment information of a target segment in another representation in the specific time period instead.

In a second aspect, a streaming media segment preparation apparatus is provided and includes: a first determining unit, configured to determine at least one quality point, where the at least one quality point is separately used to indicate quality of at least one target segment of streaming media in a first time period; and a second determining unit, configured to determine the at least one target segment according to the at least one quality point, determined by the first determining unit, of the streaming media in the first time period.

With reference to the second aspect, in an implementation manner of the second aspect, the first determining unit is specifically configured to obtain quality of a plurality of segments, existing in the streaming media in the first time period, to serve as candidate quality points; and select the at least one quality point from the candidate quality points according to quality distribution of the candidate quality points.

With reference to the second aspect and the foregoing implementation manner of the second aspect, in another implementation manner of the second aspect, the first determining unit is specifically configured to determine at least one quality interval according to the quality distribution of the candidate quality points; and select, from the candidate quality points, a candidate quality point corresponding to the at least one quality interval to serve as the at least one quality point, so that the at least one quality point separately falls into different intervals of the at least one quality interval.

With reference to the second aspect and the foregoing implementation manners of the second aspect, in another implementation manner of the second aspect, the first determining unit is specifically configured to select, from the candidate quality points, a quality point corresponding to preconfigured M quality points to serve as the at least one quality point.

With reference to the second aspect and the foregoing implementation manners of the second aspect, in another implementation manner of the second aspect, the first determining unit is specifically configured to select, from the candidate quality points, a quality point which has a minimum absolute value of a quality difference between the quality point and an $i^{th}$ quality point in the M quality points, to serve as the at least one quality point; or, select, from the candidate quality points, a quality point whose quality is less than that of an $i^{th}$ quality point in the M quality points and is closest to the quality of the $i^{th}$ quality point, to serve as the at least one quality point; or, select, from the candidate quality points, a quality point whose quality is greater than that of an $i^{th}$ quality point in the M quality points and is closest to the quality of the $i^{th}$ quality point, to serve as the at least one quality point, where i is a positive integer ranging from 1 to M.

With reference to the second aspect and the foregoing implementation manners of the second aspect, in another implementation manner of the second aspect, the second determining unit is specifically configured to determine the existing segment, corresponding to the at least one quality point, as the at least one target segment of the streaming media in the first time period.

With reference to the second aspect and the foregoing implementation manners of the second aspect, in another implementation manner of the second aspect, the first determining unit is specifically configured to encode the streaming media in the first time period according to a first bit rate so as to obtain a first segment; determine quality of the first segment as an initial quality point; and determine the at least one quality point based on the initial quality point.

With reference to the second aspect and the foregoing implementation manners of the second aspect, in another implementation manner of the second aspect, the first determining unit is specifically configured to generate, by iteration, the at least one quality point by using the initial quality point as an initial iteration point, using at least one quality threshold as an iterative step, and using an iteration termination condition that a bit rate corresponding to the quality point generated by iteration exceeds a preset bit rate range of the streaming media.

With reference to the second aspect and the foregoing implementation manners of the second aspect, in another implementation manner of the second aspect, the iteration termination condition further includes that the quality point generated by iteration exceeds a preset quality range.

With reference to the second aspect and the foregoing implementation manners of the second aspect, in another implementation manner of the second aspect, the second determining unit is specifically configured to determine at least one bit rate separately according to the at least one quality point; and encode the streaming media in the first time period separately according to the at least one bit rate, so as to obtain the at least one target segment of the streaming media in the first time period.

With reference to the second aspect and the foregoing implementation manners of the second aspect, in another implementation manner of the second aspect, the apparatus further includes: a third determining unit, configured to determine target segments of the streaming media in all time periods; and a generating unit, configured to generate a media presentation description file MPD, where the MPD includes segment information of the target segments in each representation of the streaming media.

With reference to the second aspect and the foregoing implementation manners of the second aspect, in another implementation manner of the second aspect, the MPD generated by the generating unit includes segment serial numbers of the target segments in each representation, and the target segments in each representation are discontinuously numbered by time period, so that a receiving end determines a time period, in which no target segment exists, in each representation according to discontinuity of the serial numbers.

With reference to the second aspect and the foregoing implementation manners of the second aspect, in another implementation manner of the second aspect, the MPD generated by the generating unit includes indication information, where the indication information is used to indicate whether each representation has a time period in which no target segment exists, or the indication information is used to indicate that each representation has a time period in which no target segment exists.

With reference to the second aspect and the foregoing implementation manners of the second aspect, in another implementation manner of the second aspect, the indication information is used to indicate a serial number of a time period, in which no target segment exists, in each representation.

With reference to the second aspect and the foregoing implementation manners of the second aspect, in another implementation manner of the second aspect, when each representation does not have segment information of a target segment in a specific time period, the MPD generated by the generating unit uses segment information of a target segment in another representation in the specific time period instead.

In the embodiments of the present invention, streaming media segments are prepared by taking a quality factor of the streaming media segments into consideration, which may avoid the problem that redundant segments are generated during preparation of the streaming media segments according to bit rates, thereby reducing a storage volume of a server.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
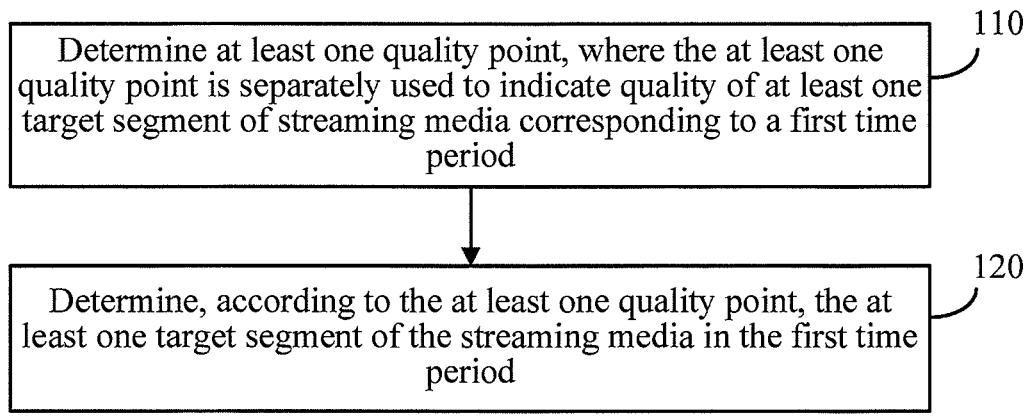
FIG. 1 is a schematic flowchart of a streaming media segment preparation method according to an embodiment of the present invention.

FIG. 1 is a schematic flowchart of a streaming media segment preparation method according to an embodiment of the present invention. The method in FIG. 1 may be executed by a server where streaming media is located, and may also be executed by a dedicated streaming media segment preparation unit, where the streaming media segment preparation unit may be an independent physical apparatus, and may also be a logical unit. The embodiment of the present invention is not limited thereto.

110: Determine at least one quality point, where the at least one quality point is separately used to indicate quality of at least one target segment of streaming media in a first time period.

120: Determine, according to the at least one quality point, the at least one target segment of the streaming media in the first time period.

In the embodiment of the present invention, streaming media segments are prepared by taking a quality factor of the streaming media segments into consideration, which may avoid the problem that redundant segments are generated during preparation of the streaming media segments according to bit rates, thereby reducing a storage volume of the server.

It should be noted that, in the embodiment of the present invention, a plurality of target segments generated in the first time period of the streaming media has same streaming media content, and different bit rates or quality. The segment preparation manner in another time period may use any segment preparation manner in the embodiment of the present invention. Further, segment preparation in a plurality of time periods may be implemented in order, or implemented in parallel, or implemented according to any preset rule, and the embodiment of the present invention is not limited thereto.

It should be noted that, a specific form of the quality in step 110 is not limited in the embodiment of the present invention, and the quality may be quality of a video, or quality of an audio, or a combination of the two. Specifically, the quality may be a peak signal to noise ratio (Peak Signal to Noise Ratio, PSNR), a mean opinion score (Mean Opinion Score, MOS), or structural similarity (Structural Similarity, SSIM), and may also be other subjective or objective quality information.

It should be understood that, the first time period in step 110 may be any time period in the entire streaming media.

It should be understood that, in step 110, the at least one quality point being separately used to indicate the quality of the at least one target segment of the streaming media corresponding to the first time period may refer to that the at least one quality point is one-to-one corresponding to the at least one target segment, and each quality point describes the quality of the target segment corresponding to the quality point.

It should be understood that, in the embodiment of the present invention, the quality point is one-to-one corresponding to the quality, and may be considered as a quantized value of the quality.

It should be noted that, a specific manner of determining at least one quality point in step 110 is not limited in the embodiment of the present invention.

Specifically, the at least one quality point may be determined according to visual and/or auditory perception of a human on the streaming media. The determining the at least one quality point in this manner may avoid generation of redundant segments on the premise that user experience is maintained, thereby reducing the storage volume of the server. For example, a plurality of quality intervals is determined according to the content of the streaming media and a threshold of a visual/audio resolution of a human, a quality point is selected in each interval, and a segment corresponding to the quality point is obtained to serve as the at least one target segment in step 120.

Optionally, as another embodiment, the determining at least one quality point in step 110 may include: obtaining quality of a plurality of segments, existing in the streaming media in the first time period, to serve as candidate quality points; and selecting the at least one quality point from the candidate quality points according to quality distribution of the candidate quality points. Specifically, a plurality of segments of the streaming media has been generated by using a method in the prior art. In this case, according to the embodiment of the present invention, quality of the existing segments is firstly determined as candidate quality points, for example, according to segment quality information carried in the existing segments, or according to quality information of the existing segments which is carried in a media description information file, or according to quality information of the segments which is directly output by an encoder; and then, the at least one quality point described in step 110 is selected from the candidate quality points.

A specific manner of selecting, from the candidate quality points, the at least one quality point described in step 110 is not limited in the embodiment of the present invention, for example, the manner may be a manner of setting a quality interval, or a manner of setting a quality point.

Optionally, as one embodiment, the selecting the at least one quality point from the candidate quality points according to quality distribution of the candidate quality points may include: determining at least one quality interval according to the quality distribution of the candidate quality points; and selecting, from the candidate quality points, a candidate quality point corresponding to the at least one quality interval to serve as the at least one quality point, so that the at least one quality point separately falls into different intervals of the at least one quality interval.

For example, according to the existing segment preparation method, eight segments of different quality of the streaming media are generated in a certain time period to serve as the existing segments, where the quality is 1 to 8 separately. Firstly, an interval [1,4) is determined, and the quality falling into the interval is separately 1, 2, and 3, from which the existing segment of the quality being 1 is selected as one of the target segments; then, a next interval is determined, for example, [4,6), and the quality falling into the interval is separately 4 and 5, from which the existing segment of the quality being 4 is selected as one of the target segments; similarly, an interval [6,9) is further determined, and the quality falling into the interval is separately 6, 7, and 8, from which the existing segment of the quality being 6 is selected as one of the target segments. According to the foregoing procedures, the at least one target segment described in step 110 is the existing segments of the quality being 1, 4, and 6.

It should be noted that, in the embodiment of the present invention, an interval may be selected according to the threshold of the visual/audio resolution of a human, for example, it is difficult for a human to distinguish streaming media content of the quality ranging from 1 to 4, and then the interval may be set to [1,4).

It should be further noted that, the quality falling into the interval may be selected according to a rule of a maximum distance, for example, a minimum value of the quality falling into a first interval is selected from the first interval, and a minimum value of the quality falling into a next interval is also selected from the next interval, which therefore leads to a large quality distance in the target segments and obvious improvement of the quality of different target segments. Definitely, the embodiment of the present invention is not limited thereto. Any quality point falling into the interval may be selected.

Optionally, as another embodiment, the selecting the at least one quality point from the candidate quality points according to quality distribution of the candidate quality points may include: selecting, from the candidate quality points, a quality point corresponding to preconfigured M quality points to serve as the at least one quality point.

A specific manner of selecting, from the candidate quality points, a quality point corresponding to preconfigured M quality points to serve as the at least one quality point is not limited in the embodiment of the present invention.

Optionally, the selecting, from the candidate quality points, a quality point corresponding to preconfigured M quality points to serve as the at least one quality point may include: selecting, from the candidate quality points, a quality point which has a minimum absolute value of a quality difference between the quality point and an $i^{th}$ quality point in the M quality points, to serve as the at least one quality point; or, selecting, from the candidate quality points, a quality point whose quality is less than that of an $i^{th}$ quality point in the M quality points and is closest to the quality of the $i^{th}$ quality point, to serve as the at least one quality point; or, selecting, from the candidate quality points, a quality point whose quality is greater than that of an $i^{th}$ quality point in the M quality points and is closest to the quality of the $i^{th}$ quality point, to serve as the at least one quality point, where i is a positive integer ranging from 1 to M.

For example, according to the existing segment preparation method, four segments of the streaming media are generated to serve as the existing segments whose quality is separately 3.1, 5.3, 10.3, and 13.6, and two quality points are separately preset to 4 and 11; then, a quality point corresponding to the preset quality point 4 is selected from the quality of the foregoing 4 existing segments, for example, the quality point 3.1 with a minimum absolute value difference is selected, and similarly, the quality point 10.3 which has a minimum absolute value difference between the quality point 10.3 and the preset quality point 11 is selected; according to the foregoing procedures, the at least one target segment described in step 110 is the existing segments of the quality being 3.1 and 10.3.

It should be noted that, in the embodiment of the present invention, a preset quality point may be selected according to the threshold of the visual/audio resolution of a human, for example, a human has a lowest requirement on quality that the quality reaches 4, and can hardly distinguish quality of streaming media ranging from 4 to 10; therefore, 11 may be used as a next preset quality point.

In the foregoing, the at least one quality point in step 110 is selected based on the existing segment, and then, optionally, the determining the at least one target segment according to the at least one quality point in step 120 may include: determining the existing segment corresponding to the at least one quality point to serve as the at least one target segment. That is, the at least one quality point in step 110 is the quality point of the existing segment, and for the selection of the target segment, it only needs to use the existing segment corresponding to the at least one quality point as the target segment.

Definitely, a manner of determining at least one quality point in step 110 may further include: encoding the streaming media in the first time period according to a first bit rate, so as to obtain a first segment; determining quality of the first segment as an initial quality point; and determining the at least one quality point based on the initial quality point.

The first bit rate may be a minimum encoding bit rate of the streaming media, a maximum encoding bit rate of the streaming media, or any bit rate in a bit rate range, and the embodiment of the present invention is not limited thereto.

It should be noted that, a specific manner of determining the at least one quality point based on the initial quality point is not limited in the embodiment of the present invention, for example: generating, by iteration, the at least one quality point by using the initial quality point as an initial iteration point, using at least one quality threshold as an iterative step, and using an iteration termination condition that a bit rate corresponding to the quality point generated by iteration exceeds a preset bit rate range of the streaming media. The iterative step may be a fixed step or a variable step, and the iterative step may be determined according to the visual/audio resolution of a human on the streaming media.

For example, the streaming media in step 110 is encoded with a minimum bit rate R0 to generate a first segment, and quality of the first segment is determined as Q0=1; a next iteration point Q1=1.5 is obtained by using Q0 as an initial iteration point and 0.5 as an iterative step; a bit rate of a segment of the quality being 1.5 is determined, for example, R1 may be determined according to a formula $R1=4*R0*2^{(Q0-Q1)/6}$; when R1 does not exceed a preset bit rate range, iteration is performed continuously, until Ri exceeds a preset maximum bit rate range.

It should be understood that, the iterative step may be fixed or variable, and the iterative step may be selected based on the visual/audio resolution of a human on the streaming media quality. Specifically, if the visual/audio resolution of a human on streaming media basically uses 0.5 as a unit, 0.5 may be selected as the iterative step; if the visual/audio resolution of a human on streaming media varies with the quality of the streaming media, the iterative step may be set to be variable, for example, when the quality is 1, the visual/audio resolution of a human on streaming media is 0.5, and when the quality is 1.5, the visual/audio resolution of a human on streaming media becomes 0.7, and 0.7 is preferably selected as a next iterative step.

The iteration termination condition may also be that the quality point generated by iteration exceeds a preset maximum quality range, and selection of the maximum quality range may be determined according to a range of visual and audio quality of streaming media which is distinguished by a human, for example, the minimum quality and the maximum quality that can be distinguished by a human are respectively 1 and 10, and in this case, the maximum quality range may be set to 1-10.

Definitely, the iteration termination condition may also be a combination of the preset bit rate range and the maximum quality range, that is, a new quality point is generated each time the iteration is performed. The new quality point not only needs to meet the preset bit rate range, but also needs to meet the preset maximum quality range.

It should be noted that, after the at least one quality point is determined according to the initial quality point, the determining the at least one target segment according to the at least one quality point may include: determining at least one bit rate separately according to the at least one quality point; and encoding the streaming media in the first time period separately according to the at least one bit rate, so as to obtain the at least one target segment.

Specifically, a formula $Ri=4*Rj*2^{(Qj-Qi)/6}$ may be used, where Rj and Qj are a bit rate and quality of an existing segment respectively.

Optionally, as one embodiment, the method further includes: determining target segments of the streaming media in all time periods; and generating a media presentation description file MPD, where the MPD includes segment information of the target segments in each representation of the streaming media.

Optionally, as another embodiment, the MPD includes segment serial numbers of the target segments in each representation, and the target segments in each representation are discontinuously numbered by time period, so that a receiving end determines a time period, in which no target segment exists, in each representation according to discontinuity of the serial numbers.

It should be noted that, a specific manner of numbering is not limited in the embodiment of the present invention, for example, numbering may be performed according to playing time of the target segments in the entire streaming media, for example, a first target segment is numbered as 0 to 10 minutes; numbering may also be performed according to time periods of the target segments, for example, a third target segment is numbered as 3; definitely, numbering may also be performed according to segment IDs in other forms.

The discontinuous numbering by time period may specifically refer to that, using numbering by time period as an example, if a target segment exists in a first time period, a serial number is 1; if no target serial number exists in a second time period, a serial number 2 is skipped; if a target serial number exists in a third time period, a serial number is 3; the rest can be processed in the same way, and 1, 3 . . . is recorded in an MPD file. When a receiving end parses the MPD file, it can be known according to the absence of the serial number 2 between 1 and 3 that no target segment exists in the time period 2.

Optionally, as another embodiment, the MPD includes indication information, where the indication information is used to indicate whether each representation has a time period in which no target segment exists, or the indication information is used to indicate a time period, in which no target segment exists, in the MPD.

Optionally, as another embodiment, the indication information is used to indicate a serial number of a time period, in which no target segment exists, in each representation.

For example, if the indication information corresponding to a certain representation in the MPD is 1, it indicates that no target segment exists in a certain time period of the representation, and if the indication information is 2, it indicates that target segments exist in all time periods of the representation.

Definitely, the MPD may also specifically indicate a time period, in which no target segment exists, in each representation, for example, the indication information corresponding to a first representation is 1, 4, and 5, it indicates that no target segment exists in a first time period, a fourth time period, and a fifth time period.

Optionally, as another embodiment, when each representation does not have segment information of a target segment in a specific time period, the MPD uses segment information of a target segment in another representation in the specific time period instead.

For example, in the MPD, a first representation is (1,1), (1,2), and (2,3), where a first item in a bracket indicates an ID of the representation, and a second item indicates an ID of a time period; therefore, target segments exist in the first two time periods of the first representation, no target segment exists in the third time period (2,3), and the third time period is replaced by a time period 3 in a second representation.

Specifically, an existing media presentation description file (Media presentation description file, MPD) may still be used. When a server detects that a segment (segment) requested by a client does not exist, the server sends a corresponding segment of another bit stream (or representation (representation)) to the client; or a new MPD is generated, a segment that does not exist in a bit stream may be identified in the MPD, and when the client parses the segment with the identification, the client may switch to a corresponding segment of another bit stream; or the MPD replaces a segment that does not exist in a bit stream with a segment in another bit stream, and when the client parses the segment that does not exist, the client switches to the segment of another bit stream; or segment IDs (segment ID) of a bit stream in the MPD is discontinuous, and when the client detects a discontinuous ID, the client switches, at a discontinuous location, to a corresponding segment of another bit stream.

When the client requests streaming media data to the server, a specific process may be as follows:

firstly obtaining the MPD; then parsing the MPD, and selecting one representation from a plurality of representations described in the MPD; and if the representation does not have segment information in a certain time period, using a corresponding segment of another representation in the time period instead, and sending a request message that requests the corresponding segment to the server.

It should be understood that, the sending a request message to the server may be sending a request message to the server each time a time period in which no segment information exists is parsed in a playing process; and may also be determining all time periods, in which no segment information exists, in the representation before playing, and determining a replaceable segment of another representation in a corresponding time period, then determining segments to be requested in different time periods, and sending a request message that requests the segment to the server.

Correspondingly, at a server end, a specific process may be as follows:

receiving a segment request of the client; and searching for a requested segment, where when the requested segment does not exist, a segment, which is in a same time period with the requested segment, in another representation may be sent.

The embodiments of the present invention are described in further detail in the following with reference to specific examples. It should be noted that, examples in FIG. 2 to FIG. 6 are merely used for helping persons skilled in the art understand the embodiments of the present invention, instead of limiting the embodiments of the present invention to an exemplary specific number or specific scenario. Apparently, persons skilled in the art can make various equivalent modifications or changes according to the examples provided in FIG. 2 to FIG. 6, and the modifications or changes also fall into the scope of the embodiments of the present invention.

Figure 2:
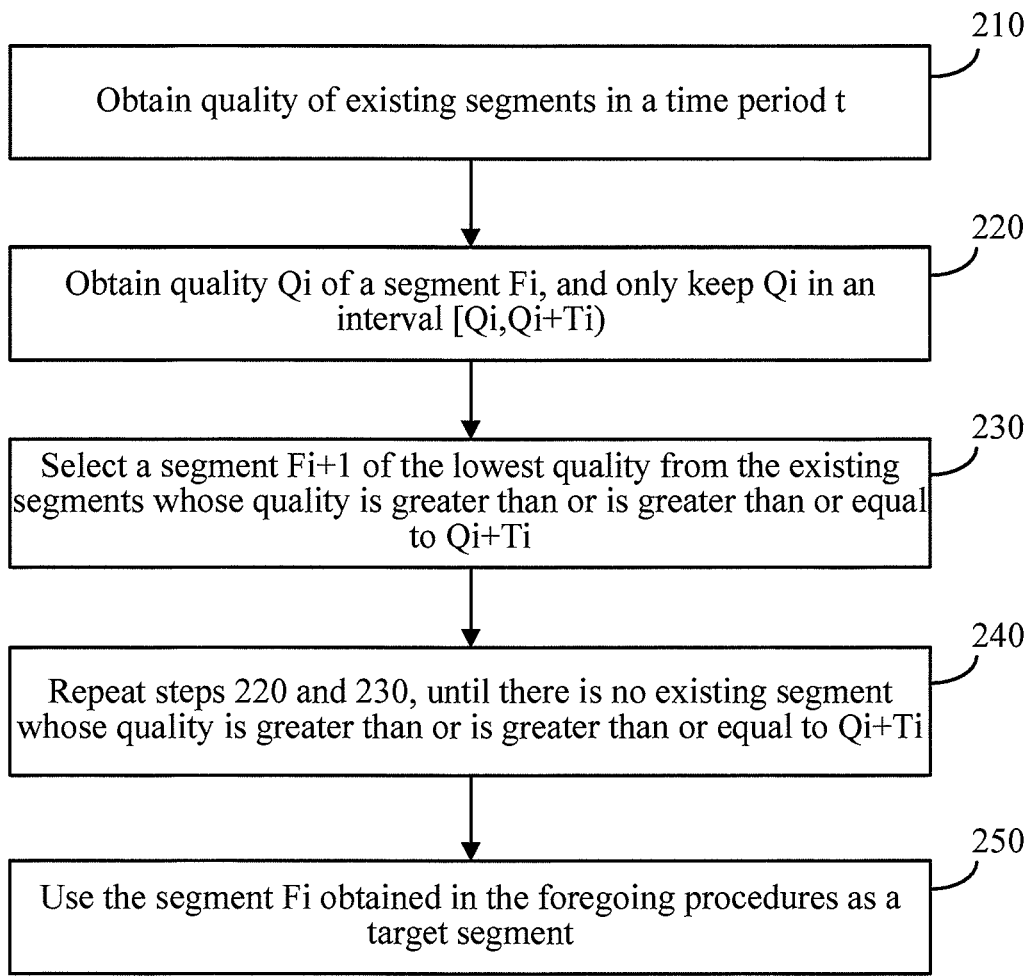
FIG. 2 is a flowchart of a streaming media segment preparation method according to another embodiment of the present invention.

FIG. 2 is a flowchart of a streaming media segment preparation method according to another embodiment of the present invention. In the method in FIG. 2, streaming media corresponding to a time period t (the time period t is a random time period) has been segmented according to the existing method. In the method, quality of existing segments is firstly determined based on the existing segments, then quality intervals are successively determined from the lowest quality according to the quality of the existing segments, and existing segments meeting a condition (one quality point is selected in each interval at most) are selected according to the quality intervals to serve as target segments. A specific process is as follows:

210: Obtain quality of existing segments in a time period t.

The quality may be a PSNR, an MOS, SSIM, or other subjective and objective quality information.

Optionally, a quality range may be set in advance, and a segment beyond the quality range is first excluded. The quality range may be selected according to a range of a visual/audio resolution of a human on streaming media.

220: Obtain quality $Q_i$ of a segment $F_i$, and only keep $Q_i$ in an interval $[Q_i, Q_i+T_i]$.

A segment of the lowest quality is started from. A quality threshold $T_i$ may be a fixed value and may also vary with i; and $T_i$ may be selected according to a resolution of a human on visual and audio quality of streaming media.

230: Select a segment $F_{i+1}$ of the lowest quality from the existing segments whose quality is greater than or is greater than or equal to $Q_i+T_i$.

A value of i starts from 0, and is added by 1 successively.

240: Repeat steps 220 and 230, until there is no existing segment whose quality is greater than or is greater than or equal to $Q_i+T_i$.

250: Use the segment $F_i$ obtained in the foregoing procedures as a target segment.

In the embodiment of the present invention, streaming media segments are prepared by taking a quality factor of the streaming media segments into consideration, which may avoid the problem that redundant segments are generated during preparation of the streaming media segments according to bit rates, thereby reducing a storage volume of a server.

Figure 3:
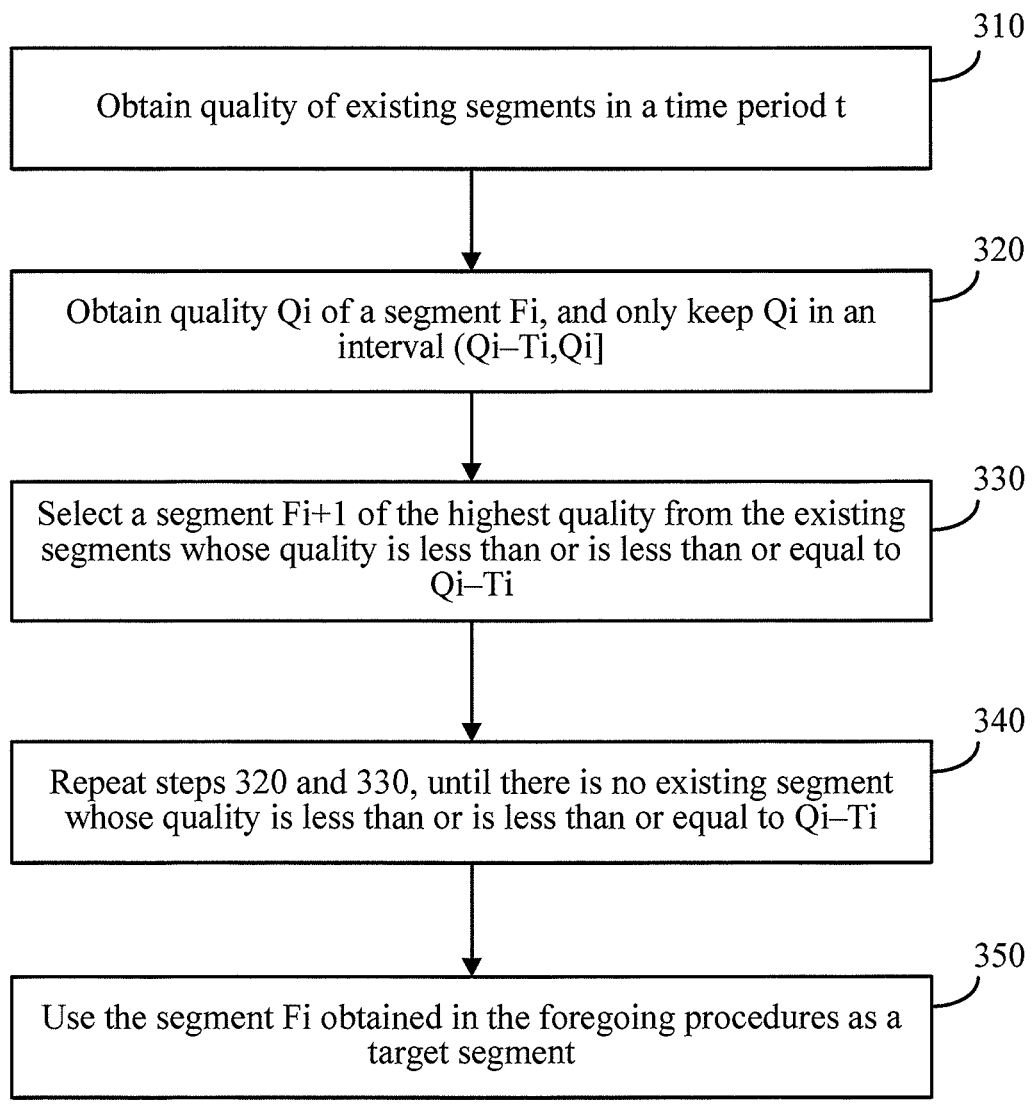
FIG. 3 is a flowchart of a streaming media segment preparation method according to another embodiment of the present invention.

FIG. 3 is a flowchart of a streaming media segment preparation method according to another embodiment of the present invention. In the method in FIG. 3, streaming media corresponding to a time period t (the time period t is a random time period) has been segmented according to the existing method. In the method, quality of existing segments is firstly determined based on the existing segments, then quality intervals are successively determined from the highest quality according to the quality of the existing segments, and existing segments meeting a condition (one quality point is selected in each interval at most) are selected according to the quality intervals to serve as target segments. A specific process is as follows:

310: Obtain quality of existing segments in a time period t.

The quality may be a PSNR, an MOS, SSIM, or other subjective and objective quality information.

320: Obtain quality $Q_i$ of a segment $F_i$, and only keep $Q_i$ in an interval $(Q_i-T_i, Q_i]$.

A segment of the highest quality is started from.

330: Select a segment $F_{i+1}$ of the highest quality from the existing segments whose quality is less than or is less than or equal to $Q_i-T_i$.

A value of i starts from 0, and is added by 1 successively. A quality threshold $T_i$ may be a fixed value and may also vary with i; and Ti may be selected according to a resolution of a human on visual and audio quality of streaming media.

340: Repeat steps 320 and 330, until there is no existing segment whose quality is less than or is less than or equal to Qi−Ti.

350: Use the segment Fi obtained in the foregoing procedures as a target segment.

In the embodiment of the present invention, streaming media segments are prepared by taking a quality factor of the streaming media segments into consideration, which may avoid the problem that redundant segments are generated during preparation of the streaming media segments according to bit rates, thereby reducing a storage volume of a server.

Figure 4:
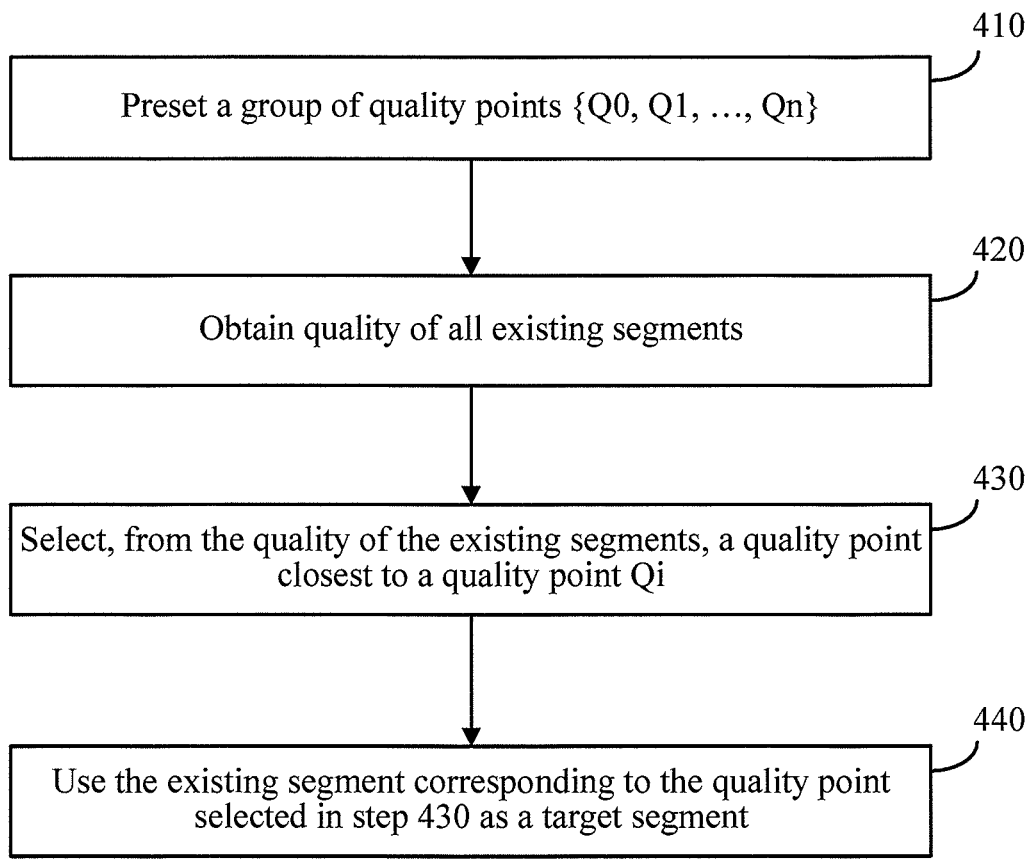
FIG. 4 is a flowchart of a streaming media segment preparation method according to another embodiment of the present invention.

FIG. 4 is a flowchart of a streaming media segment preparation method according to another embodiment of the present invention. In the method in FIG. 4, streaming media corresponding to a time period t (the time period t is a random time period) has been segmented according to the existing method. Firstly, a group of quality points are preset, and then segments corresponding to quality points closest to the preset quality points are selected from the quality of the existing segments to serve as target segments.

410: Preset a group of quality points {Q0, Q1, . . . , Qn}.

420: Obtain quality of all existing segments.

430: Select, from the quality of the existing segments, a quality point closest to a quality point Qi.

A value of i ranges from 0 to n.

Optionally, in step 430, a quality point whose quality is less than Qi and closest to Qi, or a quality point whose quality is greater than Qi and closest to Qi may further be selected.

440: Use the existing segment corresponding to the quality point selected in step 430 as a target segment.

In the embodiment of the present invention, streaming media segments are prepared by taking a quality factor of the streaming media segments into consideration, which may avoid the problem that redundant segments are generated during preparation of the streaming media segments according to bit rates, thereby reducing a storage volume of a server.

Figure 5:
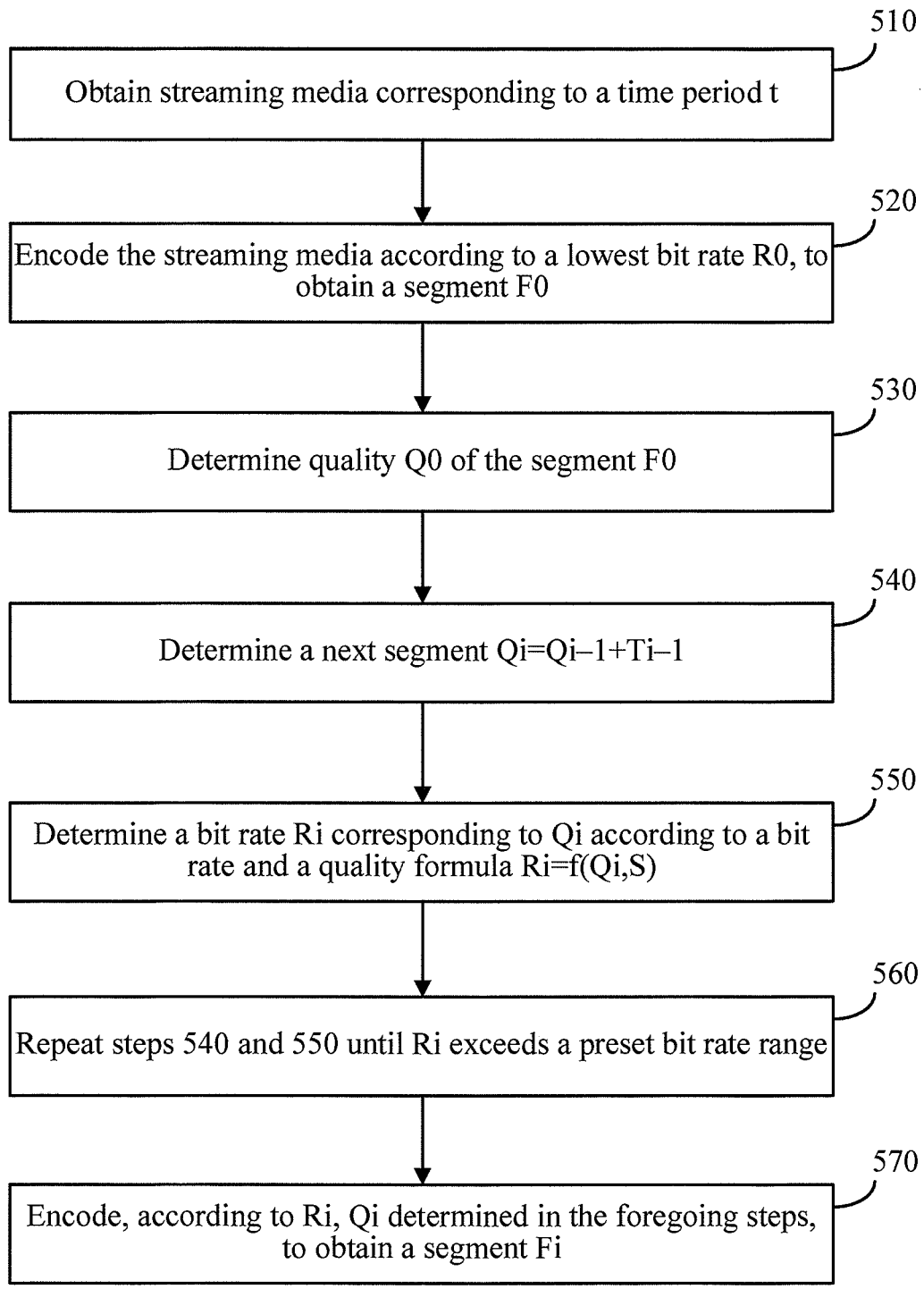
FIG. 5 is a flowchart of a streaming media segment preparation method according to another embodiment of the present invention.

FIG. 5 is a flowchart of a streaming media segment preparation method according to another embodiment of the present invention. In the method in FIG. 5, streaming media corresponding to a time period t (the time period t is a random time period) is not segmented. In the method, the streaming media is firstly encoded according to a lowest bit rate R0 for encoding the streaming media, to obtain a segment F0; quality Q0 of F0 is determined; a plurality of quality points meeting a bit rate condition is obtained by iteration by using Q0 as an initial iteration point and using a fixed or variable iterative step; and finally, segments corresponding to the quality points obtained by iteration are determined.

510: Obtain streaming media corresponding to a time period t.

520: Encode the streaming media according to a lowest bit rate R0, to obtain a segment F0.

530: Determine quality Q0 of the segment F0.

540: Determine quality of a next segment Qi=Qi−1+Ti−1.

A value of i starts from 1. Optionally, when Qi exceeds a preset maximum quality range, skip to step 570.

550: Determine a bit rate Ri corresponding to Qi according to a bit rate and a quality formula Ri=f(Qi,S).

Optionally, a formula $Ri=Rj*2^{(Qi-Qj)/6}$ is used to determine Ri.

560: Repeat steps 540 and 550 until Ri exceeds a preset bit rate range.

570: Encode, according to Ri, Qi determined in the foregoing steps, to obtain a segment Fi.

In the embodiment of the present invention, streaming media segments are prepared by taking a quality factor of the streaming media segments into consideration, which may avoid the problem that redundant segments are generated during preparation of the streaming media segments according to bit rates, thereby reducing a storage volume of a server.

Figure 6:
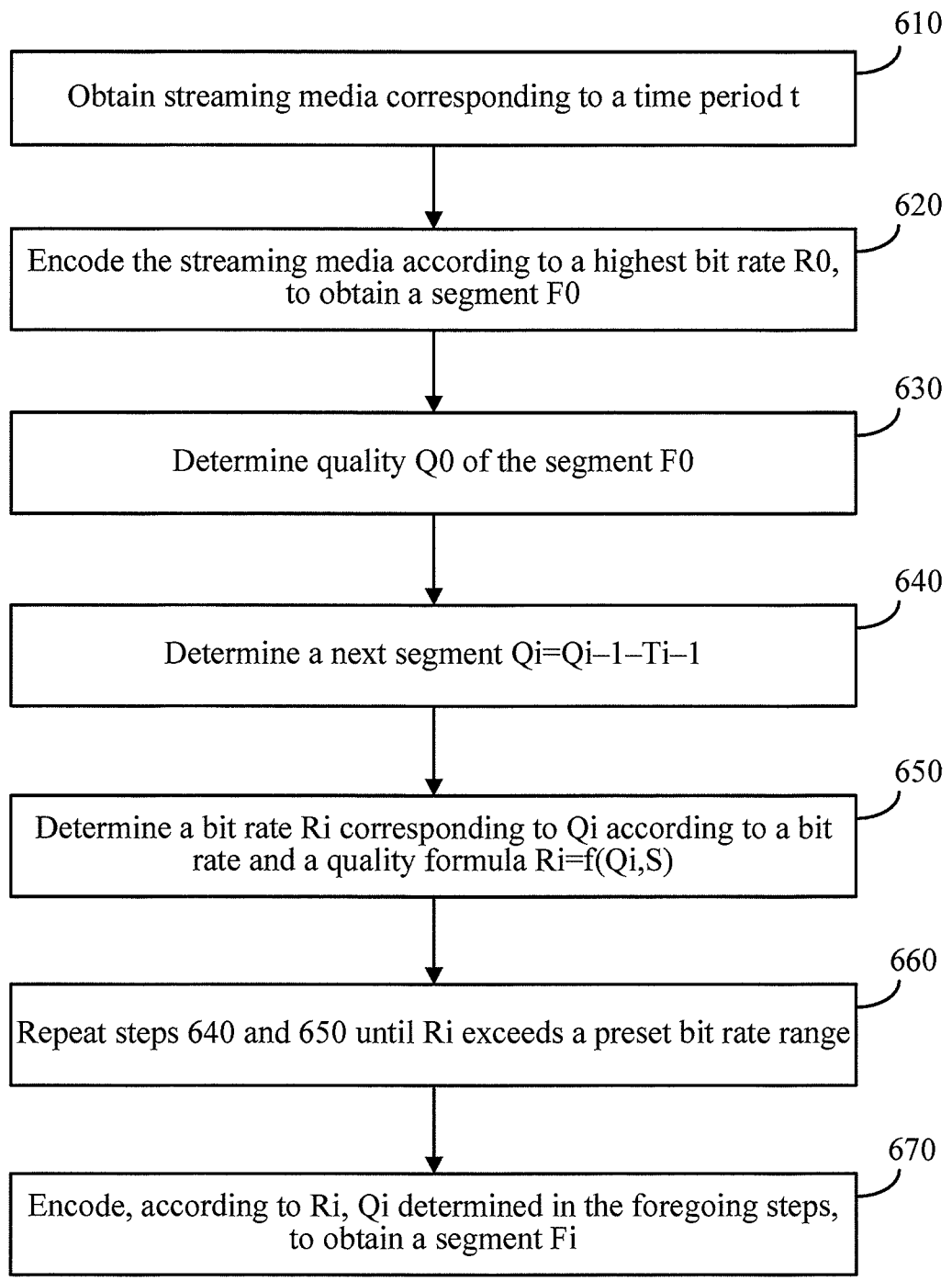
FIG. 6 is a flowchart of a streaming media segment preparation method according to another embodiment of the present invention.

FIG. 6 is a flowchart of a streaming media segment preparation method according to another embodiment of the present invention. In the method in FIG. 6, streaming media corresponding to a time period t (the time period t is a random time period) is not segmented. In the method, the streaming media is firstly encoded according to a highest bit rate R0 for encoding the streaming media, to obtain a segment F0; quality Q0 of F0 is determined; a plurality of quality points meeting a bit rate condition is obtained by iteration by using Q0 as an initial iteration point and using a fixed or variable iterative step; and finally, segments corresponding to the quality points obtained by iteration are determined.

610: Obtain streaming media corresponding to a time period t.

620: Encode the streaming media according to a highest bit rate R0, to obtain a segment F0.

630: Determine quality Q0 of the segment F0.

640: Determine quality of a next segment Qi=Qi−1−Ti−1.

A value of i starts from 1. Optionally, when Qi exceeds a preset maximum quality range, skip to step 670.

650: Determine a bit rate Ri corresponding to Qi according to a bit rate and a quality formula Ri=f(Qi,S).

Optionally, a formula $Ri=Rj*2^{(Qi-Qj)/6}$ is used to determine Ri.

660: Repeat steps 640 and 650 until Ri exceeds a preset bit rate range.

670: Encode, according to Ri, Qi determined in the foregoing steps, to obtain a segment Fi.

In the embodiment of the present invention, streaming media segments are prepared by taking a quality factor of the streaming media segments into consideration, which may avoid the problem that redundant segments are generated during preparation of the streaming media segments according to bit rates, thereby reducing a storage volume of a server.

The streaming media segment preparation method according to the embodiments of the present invention is described in detail in the foregoing with reference to FIG. 1 to FIG. 6; and a streaming media segment preparation apparatus according to embodiments of the present invention is described in detail in the following with reference to FIG. 7.

Figure 7:
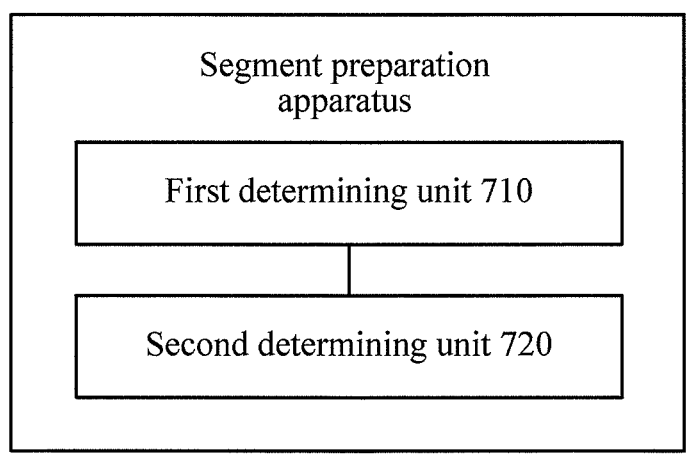
FIG. 7 is a streaming media segment preparation apparatus according to an embodiment of the present invention.

FIG. 7 is a streaming media segment preparation apparatus according to an embodiment of the present invention. The apparatus in FIG. 7 includes a first determining unit 710 and a second determining unit 720.

It should be understood that, the apparatus in FIG. 7 can implement the steps in FIG. 1 to FIG. 6, and the details are not repeated herein for the purpose of brevity.

The first determining unit 710 is configured to determine at least one quality point, where the at least one quality point is separately used to indicate quality of at least one target segment of streaming media corresponding to a first time period.

The second determining unit 720 is configured to determine the at least one target segment according to the at least one quality point determined by the first determining unit 710.

In the embodiment of the present invention, streaming media segments are prepared by taking a quality factor of the streaming media segments into consideration, which may avoid the problem that redundant segments are generated during preparation of the streaming media segments according to bit rates, thereby reducing a storage volume of a server.

Optionally, as an embodiment, the first determining unit 710 is specifically configured to obtain quality of a plurality of segments existing in the streaming media to serve as candidate quality points; and select the at least one quality point from the candidate quality points according to quality distribution of the candidate quality points.

Optionally, as another embodiment, the first determining unit 710 is specifically configured to determine at least one quality interval according to the quality distribution of the candidate quality points; and select, from the candidate quality points, a candidate quality point corresponding to the at least one quality interval to serve as the at least one quality point, so that the at least one quality point separately falls into different intervals of the at least one quality interval.

Optionally, as another embodiment, the first determining unit 710 is specifically configured to select, from the candidate quality points, a quality point corresponding to preconfigured M quality points to serve as the at least one quality point.

Optionally, as another embodiment, the first determining unit 710 is specifically configured to select, from the candidate quality points, a quality point which has a minimum absolute value of a quality difference between the quality point and an $i^{th}$ quality point in the M quality points, to serve as the at least one quality point; or, select, from the candidate quality points, a quality point whose quality is less than that of an $i^{th}$ quality point in the M quality points and is closest to the quality of the $i^{th}$ quality point, to serve as the at least one quality point; or, select, from the candidate quality points, a quality point whose quality is greater than that of an $i^{th}$ quality point in the M quality points and is closest to the quality of the $i^{th}$ quality point, to serve as the at least one quality point, where i is a positive integer ranging from 1 to M.

Optionally, as another embodiment, the second determining unit 720 is specifically configured to determine an existing segment corresponding to the at least one quality point to serve as the at least one target segment.

Optionally, as another embodiment, the first determining unit 710 is specifically configured to encode the streaming media in the first time period according to a first bit rate so as to obtain a first segment; determine quality of the first segment as an initial quality point; and determine the at least one quality point based on the initial quality point.

Optionally, as another embodiment, the first determining unit 710 is specifically configured to generate, by iteration, the at least one quality point by using the initial quality point as an initial iteration point, using at least one quality threshold as an iterative step, and using an iteration termination condition that a bit rate corresponding to the quality point generated by iteration exceeds a preset bit rate range of the streaming media.

Optionally, as another embodiment, the iteration termination condition further includes that the quality point generated by iteration exceeds a preset quality range.

Optionally, as another embodiment, the second determining unit 720 is specifically configured to determine at least one bit rate separately according to the at least one quality point; and encode the streaming media separately according to the at least one bit rate, so as to obtain the at least one target segment.

Optionally, as another embodiment, the apparatus further includes: a third determining unit, configured to determine target segments of the streaming media in all time periods; and a generating unit, configured to generate a media presentation description file MPD, where the MPD includes segment information of target segments in each representation of the streaming media.

Optionally, as another embodiment, the MPD generated by the generating unit includes segment serial numbers of the target segments in each representation, and the target segments in each representation are discontinuously numbered by time period, so that a receiving end determines a time period, in which no target segment exists, in each representation according to discontinuity of the serial numbers.

Optionally, as another embodiment, the MPD generated by the generating unit includes indication information, where the indication information is used to indicate whether each representation has a time period in which no target segment exists, or the indication information is used to indicate a time period, in which no target segment exists, in each representation.

Optionally, as another embodiment, the indication information is used to indicate a serial number of a time period, in which no target segment exists, in each representation.

Optionally, as another embodiment, when each representation does not have segment information of a target segment in a specific time period, the MPD generated by the generating unit uses segment information of a target segment in another representation in the specific time period instead.

Persons of ordinary skill in the art should be aware that, exemplary units and arithmetic steps described with reference to the embodiments disclosed in the present invention may be accomplished through electronic hardware, or through a combination of computer software plus the electronic hardware. Whether these functions are executed as hardware or software depends upon the particular application and design constraint conditions of the technical solution. Persons skilled in the art can use different methods to implement the described functions for each particular application, but it should not be considered that the implementation goes beyond the scope of the present invention.

It can be clearly understood by persons skilled in the art that, for the purpose of convenient and brief description, for a detailed working process of the foregoing system, apparatus, and units, reference may be made to the corresponding process in the method embodiments, and the details are not described herein again.

In several embodiments provided in the present application, it should be understood that the disclosed system, apparatus, and method may be implemented in other manners. For example, the described appararus embodiments are merely exemplary. For example, the unit division is merely logical function division and can be other division in actual implementation. For example, a plurality of units or components can be combined or integrated into another system, or some features can be ignored or not performed. Furthermore, the shown or discussed coupling or direct coupling or communication connection may be accomplished through some interfaces, and indirect coupling or communication connection between apparatuses or units may be electrical, mechanical, or in other forms.

Units described as separate components may be or may not be physically separated. Components shown as units may be or may not be physical units, that is, may be integrated or distributed to a plurality of network units. Some or all of the units may be selected to achieve the objective of the solution of this embodiment according to actual demands.

In addition, various functional units according to each embodiment of the present invention may be integrated in one processing unit or may exist as various separate physical units, or two or more units may also be integrated in one unit.

If the functions are implemented in the form of a software functional unit and are sold or used as an independent product, the functions may be stored in a computer readable storage medium. Based on this, the technical solution of the present invention or the part that makes contributions to the prior art or the part of the technical solution can be embodied in the form of a software product. The computer software product is stored in a storage medium, and contains several instructions to instruct computer equipment (for example, a personal computer, a server, or network equipment) to perform all or a part of steps of the method described in the embodiments of the present invention. The foregoing storage medium includes any medium that is capable of storing program code, such as a USB flash drive, a removable hard disk, a read-only memory (ROM, Read-Only Memory), a random access memory (RAM, Random Access Memory), a magnetic disk, or an optical disc.

The foregoing descriptions are merely several embodiments of the present invention, but not intended to limit the present invention. Various variations and modifications made by persons skilled in the art without departing from the spirit of the present invention fall within the scope of the present invention. Therefore, the protection scope of the present invention shall be subject to that of the claims.

What is claimed is:

1. A streaming media segment preparation method, comprising:
    obtaining quality of a plurality of segments, existing in streaming media in a first time period, to serve as candidate quality points;
    selecting, from the candidate quality points, a quality point which has a minimum absolute value of a quality difference between the quality point and an $i^{th}$ quality point in M quality points; or
    selecting, from the candidate quality points, a quality point whose quality is less than that of an $i^{th}$ quality point in the M quality points and is closest to the quality of the $i^{th}$ quality point; or
    selecting, from the candidate quality points, a quality point whose quality is greater than that of an $i^{th}$ quality point in the M quality points and is closest to the quality of the $i^{th}$ quality point, wherein i is a positive integer ranging from 1 to M;
    wherein the quality point is separately used to indicate quality of at least one target segment of streaming media in the first time period; and
    determining the at least one target segment of the streaming media in the first time period according to the selected quality point.

2. The method according to claim 1, further comprising:
    determining target segments of the streaming media in all time periods; and
    generating a media presentation description (MPD) file, wherein the MPD file is used to describe target segments comprised in each representation of the streaming media.

3. The method according to claim 2, wherein the MPD file comprises segment serial numbers of the target segments in each representation, and the target segments in each representation are discontinuously numbered by time period, so that a receiving end determines a time period, in which no target segment exists, in each representation according to discontinuity of the serial numbers.

4. The method according to claim 2, wherein the MPD file comprises indication information, wherein the indication information is used to indicate whether each representation has a time period in which no target segment exists, or the indication information is used to indicate a time period, in which no target segment exists, in each representation.

5. The method according to claim 4, wherein the indication information is used to indicate a serial number of a time period, in which no target segment exists, in each representation.

6. The method according to claim 2, wherein when each representation does not have segment information of a target segment in a specific time period, the MPD file uses segment information of a target segment in another representation in the specific time period instead.

7. A streaming media segment preparation apparatus, comprising:
    a first determining unit, configured on a processor to:
        obtain quality of a plurality of segments, existing in streaming media in a first time period, to serve as candidate quality points;
        select, from the candidate quality points, a quality point which has a minimum absolute value of a quality difference between the quality point and an $i^{th}$ quality point in the M quality points; or
        select, from the candidate quality points, a quality point whose quality is less than that of an $i^{th}$ quality point in the M quality points and is closest to the quality of the $i^{th}$ quality point; or
        select, from the candidate quality points, a quality point whose quality is greater than that of an $i^{th}$ quality point in the M quality points and is closest to the quality of the $i^{th}$ quality point, wherein i is a positive integer ranging from 1 to M, wherein the quality point is separately used to indicate quality of at least one target segment of streaming media in the first time period; and
    a second determining unit, configured on the processor to determine, according to the quality point selected by the first determining unit, the at least one target segment of the streaming media in the first time period.

8. The apparatus according to claim 7, further comprising:
    a third determining unit, configured on the processor to determine target segments of the streaming media in all time periods; and
    a generating unit, configured on the processor to generate a media presentation description (MPD) file, wherein the MPD file is used to describe target segments comprised in each representation of the streaming media.

9. The apparatus according to claim 8, wherein the MPD file generated by the generating unit comprises segment serial numbers of the target segments in each representation, and the target segments in each representation are discontinuously numbered by time period, so that a receiving end determines a time period, in which no target segment exists, in each representation according to discontinuity of the serial numbers.

10. The apparatus according to claim 8, wherein the MPD file generated by the generating unit comprises indication information, wherein the indication information is used to indicate whether each representation has a time period in which no target segment exists, or the indication information is used to indicate a time period, in which no target segment exists, in each representation.

11. The apparatus according to claim 10, wherein the indication information is used to indicate a serial number of a time period, in which no target segment exists, in each representation.

12. The apparatus according to claim 8, wherein when each representation does not have segment information of a target segment in a specific time period, the MPD file generated by the generating unit uses segment information of a target segment in another representation in the specific time period instead.

* * * * *